United States Patent [19]
Story

[11] Patent Number: 6,146,524
[45] Date of Patent: Nov. 14, 2000

[54] MULTI-STAGE OZONE INJECTION WATER TREATMENT SYSTEM

[76] Inventor: Craig W. Story, Suite 319, 120 E. Lake St., Sandpoint, Id. 83864

[21] Appl. No.: 09/219,611

[22] Filed: Dec. 23, 1998

Related U.S. Application Data

[63] Continuation-in-part of application No. 08/931,401, Sep. 15, 1997, abandoned.

[51] Int. Cl.$^7$ ........................................................ C02F 1/78
[52] U.S. Cl. .............................. 210/199; 210/205; 210/86; 210/97; 261/96; 261/121.1
[58] Field of Search ................................. 210/198.1, 199, 210/205, 86, 97; 261/75, 94, 96, 121.1

[56] References Cited

U.S. PATENT DOCUMENTS

| | | | |
|---|---|---|---|
| 4,077,877 | 3/1978 | Orensten et al. | 210/17 |
| 4,341,641 | 7/1982 | Novak | 210/752 |
| 4,869,852 | 9/1989 | Goudy, Jr. et al. | 261/122 |
| 5,366,619 | 11/1994 | Matsui et al. | 210/139 |
| 5,397,480 | 3/1995 | Dickerson | 210/752 |
| 5,766,488 | 6/1998 | Uban et al. | 210/739 |

Primary Examiner—David A. Simmons
Assistant Examiner—Betsey Morrison Hoey
Attorney, Agent, or Firm—Oppenheimer, Wolff & Donnelly, LLP; Claude A. S. Hamrick

[57] ABSTRACT

A two stage ozonation water purification system for eliminating deleterious pathogens from water includes: a first tank and a second tank; a conduit for delivering water to the first tank; a first ozone injection mechanism for injecting ozone into the water contained in the first tank for a first predetermined time period; a transfer conduit for transferring the water from the first tank to the second tank; and a second ozone injection mechanism for injecting ozone into the water contained in the second tank for a second predetermined time period. In one embodiment, the second tank is a dispensing tank including at least one outlet providing purified water for human consumption. Porous diffusion stones are disposed in the first and second tanks, the diffusion stones being in fluid communication with the first and second ozone injection mechanisms and providing optimal diffusion of ozone into the water contained in the first and second tanks. The first tank has a first volume, the second tank has a second volume, and the first volume is substantially smaller than the second volume.

13 Claims, 2 Drawing Sheets

MULTI-STAGE OZONE INJECTION WATER TREATMENT SYSTEM

CROSS REFERENCE TO RELATED APPLICATIONS

This Application is a continuation in part of Applicant's U.S. application Ser. No. 08/931,401, filed Sept. 15, 1997, entitled "Method and Apparatus for Eliminating Pathogens From Drinking Water", now abandoned, which is incorporated herein by reference in its entirety.

BACKGROUND OF THE INVENTION

1. Field of the Invention

The present invention relates generally to a method and apparatus for eliminating deleterious pathogens from household drinking water, and more particularly to a method and apparatus for infusing ozone into drinking water in order to purify and disinfect the water.

2. Discussion of the Prior Art

Household drinking water dispensing systems have a long history of usage. Although local water utility districts provide customers with potable drinking water, many residential water users desire to either purchase their own drinking water in place of utility-supplied water, or to provide additional treatment to utility-supplied, residential drinking water at the point of the water's use.

A residential water user's objective for either substituting or additionally treating utility-supplied drinking water is to achieve truly "clean and pure" drinking water; i.e., drinking water which is free from those heavy metals, sediments, chemicals, contaminants, pathogens, and other impurities that either cannot be or are not removed by the local water utility. Various commercial enterprises have been formed to meet this consumer demand for "clean and pure" drinking water.

One common type of residential drinking water system is the five-gallon glass or plastic water bottle which sits on a dispensing stand in the home or office. Full five-gallon water bottles are delivered to a residence (or private business) on a regular basis and exchanged for empty bottles. The commercial enterprises which provide such bottled water service to their customers make various representations regarding the water's purity and cleanliness. The water dispensing systems generally chill the drinking water, and may also have the capability to provide heated water for hot beverages.

Another common type of residential system provides supplemental treatment of water at the water's point-of-use. by filtering or purifying the drinking water within the drinking water dispensing system itself.

Another common type of water dispensing system includes an ultraviolet filter utilizing an ultraviolet lamp housed inside a glass chamber. Drinking water flows past the glass chamber as the water is being dispensed, but the water does not come in contact with the ultraviolet lamp nor is there any residual contact time between the water and the ultraviolet light. Thus, in such systems the contact time for, purposes of disinfecting the water by irradiated ultraviolet light is limited to the rate of the water flow past the lamp. Furthermore, the quartz glass of the ultraviolet light bulb is slowly solarized by the high intensity ultraviolet light. This process inevitably darkens the quartz glass, and eventually the amount of ultraviolet irradiation decreases with time. Typically, a 30-percent annual reduction in ultraviolet light intensity is observed.

Ozone injection is another commonly used method for purifying water. Ozone is commonly used as a bacteriostat in water treatment plants. It is well recognized that ozone is capable of producing the high purity, sterile water required by the pharmaceutical industry to manufacture pharmaceutical products and by the semiconductor industry to manufacture circuit boards. Almost all commercial bottled water is purified with ozone. The hotel industry utilizes ozone generators to purify recirculated air in hotel rooms. Ozone has been shown not only to destroy all bacteria completely, but also to destroy virus, spores, and cysts while it removes dissolved organic materials by oxidative processes.

Chlorine treats water much slower than ozone because it must first diffuse through the cell wall of the bacterium. Thus, contact time for chlorine eliminating a microbe can be 10–55 times longer than with ozone. Tests have shown that the rate or speed of *E. coli* kill by ozone is up to 3,000 times faster than chlorine. Cryptosporidium oocysts resist chlorinating. Disinfecting of C. parvum oocysts with chlorine at typical treatment concentrations has almost no effect, even after several hours contact time. Ozone, on the other hand, is the most effective disinfectant against C. Parvum oocysts. Ozone can completely inactivate the oocysts. Legionella is a danger when it enters the water supply distribution system because they are not killed by the usual chlorine dosage mandated for municipal disinfection.

Ozone does not produce harmful fumes, will not explode, and will not damage plumbing fittings or pipes. Ozone does not leave any chemical taste or smell. Adding ozone to household drinking water adds no contaminants or by-products to the water. Ozone is a chemical-free water treatment method that utilizes the same electrical process produced by lightning as it literally purifies the atmosphere during an electrical storm. In fact, the recognizable scent associated with a rainstorm is a result of the production of ozone in the lower atmosphere. Ozone can destroy microorganisms in water, including bacteria and viruses like *Escherichia coli* (*E. coli*), Cryptosporidium, Poliovirus, *Giardia muris*, and *Giardia lamblia*. Ozone also removes inorganic compounds, such as iron, hydrogen sulfide, and other contaminants from water.

In addition to providing purification of utility-supplied drinking water, ozone can solve most common well water problems caused by organic and inorganic compounds, including; rust or back colored water; stained clothes or fixtures; discolored, unpalatable food and beverages; slime in toilet tanks and sinks; fuzzy particles in water; smelly or cloudy water; and algae.

Ozone is a low molecular weight molecule composed of three oxygen atoms arranged in a chain. Ozone is an allotrope of oxygen, meaning it is composed of the same atoms but they are combined in a different way. Ozone is activated oxygen; i.e., the 3-atom molecule of ozone is not completely stable—it has too many atoms clinging together. Oxygen is most stable when it is only a 2-atom molecule.

In water, ozone will change back to oxygen in normal course in approximately 20 minutes. However, because of its inherent instability, any time ozone comes into contact with a different kind of molecule, like an inorganic metal (iron or manganese), or an organic molecule (bacteria or virus), the ozone molecule pulls some electrical energy away from the so-called "host" molecule. This process is called oxidation. When ozone pulls away electrical energy from a host molecule, two things happen. First, the excess energy separates one of the three oxygen atoms from the ozone molecule, leaving a stable oxygen molecule and a very unstable oxygen atom. At the same time, the host molecule that lost some of its energy wants to get that energy back. It does so by pulling in the severed oxygen atom to fill in the empty space. If it is an inorganic metal molecule, the added oxygen atom turns it into a metal oxide. If it is an organic molecule, the added oxygen atom changes the electrical bond holding the molecule together, which makes the whole molecule come apart. Bacteria and virus cells literally split apart and dissolve when they absorb an oxygen atom that has been severed from a molecule of ozone.

Bacteria are killed by ozone via rupture of the cellular membrane. This process, known as cell lysing, results in the cellular cytoplasm being dispersed in the water. Under conditions of cell lysing, reactivation of the immobilized bacteria or virus cell is impossible.

Ozone, which is a powerful oxidant, has a high chemical reactivity which arises from its unstable electron configuration that seeks electrons from other molecules. Ozone kills microorganisms by oxidative processes. During its reaction with other molecules, ozone is destroyed and the host is oxidized. The pH of water is not changed when ozone is added. This differs from other oxidizers, such as chlorine, which require the use of caustic or lime to adjust the pH, thus altering overall water quality when by-products are left in the water; for example, when chlorine reacts with the remaining organic compounds in water to from carcinogenic compounds such as the trihalomethanes.

Over a 20-year period of research, ozonation conditions have shown that in normal operation, water containing no suspended and little oxidizable matter is completely free of pathogenic bacteria after ozonation. Ozone is not just a disinfectant, it is in fact a sterilant.

Ozone has a relatively short half life. During the process of water treatment, any unused, or un-oxidized, ozone ($O_3$) reverts back to oxygen ($O_2$). Because ozone is a short-lived unstable gas it must be generated at the site of contact by an ozone generator, or ozonator. Contact time between the water and any filtering medium is the most important factor in drinking water purification. In order to optimize the mechanism of cellular destruction, bacteria should be brought into intimate contact with ozone.

Olsen (U.S. Pat. No. 5,683,576, issued Nov. 4, 1997) discloses a water ozonation treatment apparatus including: a chemical treatment tank (CT tank) having a raw water inlet for receiving raw water, an ozone inlet for receiving ozone into the CT tank in order to treat the raw water, and a treated water outlet for providing treated water; an ozone generator and pump for pumping ozone into the CT tank; a water dispensing tank having an inlet for receiving treated water from the treated water outlet of the CT tank, and a water dispensing spout; and means for recirculating water from the water dispensing to the CT tank for re-treatment when required due to recontamination.

One problem with the process taught by Olsen, in which treated water is recirculated from the dispensing tank to the CT tank for re-treatment, is that it is difficult to control the level of ozonation of the water. Overly-ozonated water has a bad taste and is therefore not desirable for human consumption. Under-ozonated water is subject to bacterial infection. Important parameters in controlling the process of ozonation of water include: the time during which the water is injected with ozone; the temperature of the ozonated water which is ideally just below room temperature; and the volume of water being ozonated. By recirculating water from a drinking water tank to a CT tank, it is difficult to track the amount of water in the CT tank which has been previously subjected to ozonation and how much of the water has not been previously subjected to ozonation.

Olsen teaches the use of ozone sensors for detecting the levels of ozone in the CT tank and dispensing tank. A microcontroller is responsive to a first ozone sensor in the dispensing tank and a second ozone sensor in the CT tank. Based on signals received from the ozone sensors, the microcontroller determines: (1) when to recirculate water from the dispensing tank to the CT tank; (2) a specific concentration of ozone in solution to be used in ozonating water in the CT tank; and a time for which the water should be treated. Therefore, in the system taught by Olsen, the level of ozonation in drinking water dispensed from the dispensing tank is dependent upon the accuracy of multiple ozone sensors. Therefore, a complex control process is required for controlling a system which recirculates water from a dispensing tank to a CT tank. The apparatus required for recirculating water, including a pump, is expensive. Also, ozone sensors and control ciruitry responsive the ozone sensors is complex and expensive.

Ozone has a relatively short half life. During the process of water treatment any unused, or unoxidized, ozone ($O_3$) reverts back to oxygen ($O_2$).

SUMMARY OF THE INVENTION

It is therefore an object of the present invention to provide a method and apparatus for purifying and disinfecting utility-supplied drinking water by oxygenating the drinking water via ozone injection to eliminate deleterious pathogens from the water, wherein the time of contact between the drinking water and the ozone, subsequent to injection of ozone into the water, is sufficient to maximize purification of the water.

Another objective of the present invention is to provide an apparatus and method of the type described which is not inordinately expensive to both acquire and use.

The present invention provides a two stage ozonation water purification system for eliminating deleterious pathogens from water, the system including: a first tank and a second tank; a conduit for delivering water to the first tank; a first ozone injection mechanism for injecting ozone into the water contained in the first tank for a first predetermined time period; a transfer conduit for transferring the water from the first tank to the second tank; and a second ozone injection mechanism for injecting ozone into the water contained in the second tank for a second predetermined time period. In one embodiment, the second tank is a dispensing tank including at least one outlet providing purified water for human consumption.

Porous diffusion stones are disposed in the first and second tanks, the diffusion stones being in fluid communication with the first and second ozone injection mechanisms and providing optimal diffusion of ozone into the water contained in the first and second tanks.

In one embodiment, the first tank has a first volume, the second tank has a second volume, and the first volume is substantially smaller than the second volume. Also, in this embodiment, the first predetermined time period is approximately six minutes, and the second predetermined time period is approximately 2 minutes.

An advantage of the present invention is that the two stage ozonation process provides accurate and precise control of the level of ozone in drinking water dispensed from the second water tank.

Another advantage of the present invention is that the two stage ozonation process may be easily controlled without the use of ozone sensors.

A further advantage of the present invention is that the time of contact between the drinking water and the ozone, subsequent to injection of ozone into the water, is sufficient to maximize purification of the water.

These and other objects and advantages of the present invention will become apparent to those skilled in the art after having read the following detailed description of a preferred embodiment, and which is illustrated in the drawings.

IN THE DRAWING

FIG. 1 shows a block diagram of a two-stage ozone injection drinking water purification system in accordance with the present invention; and FIG. 2 shows a block diagram illustrating components of a control unit of the purification system of FIG. 1; and FIG. 3 shows a perspective view of a collapsble drinking water tank in accordance with an alternative embodiment of the present invention.

DETAILED DESCRIPTION OF THE PREFERRED EMBODIMENT

Figure 1:
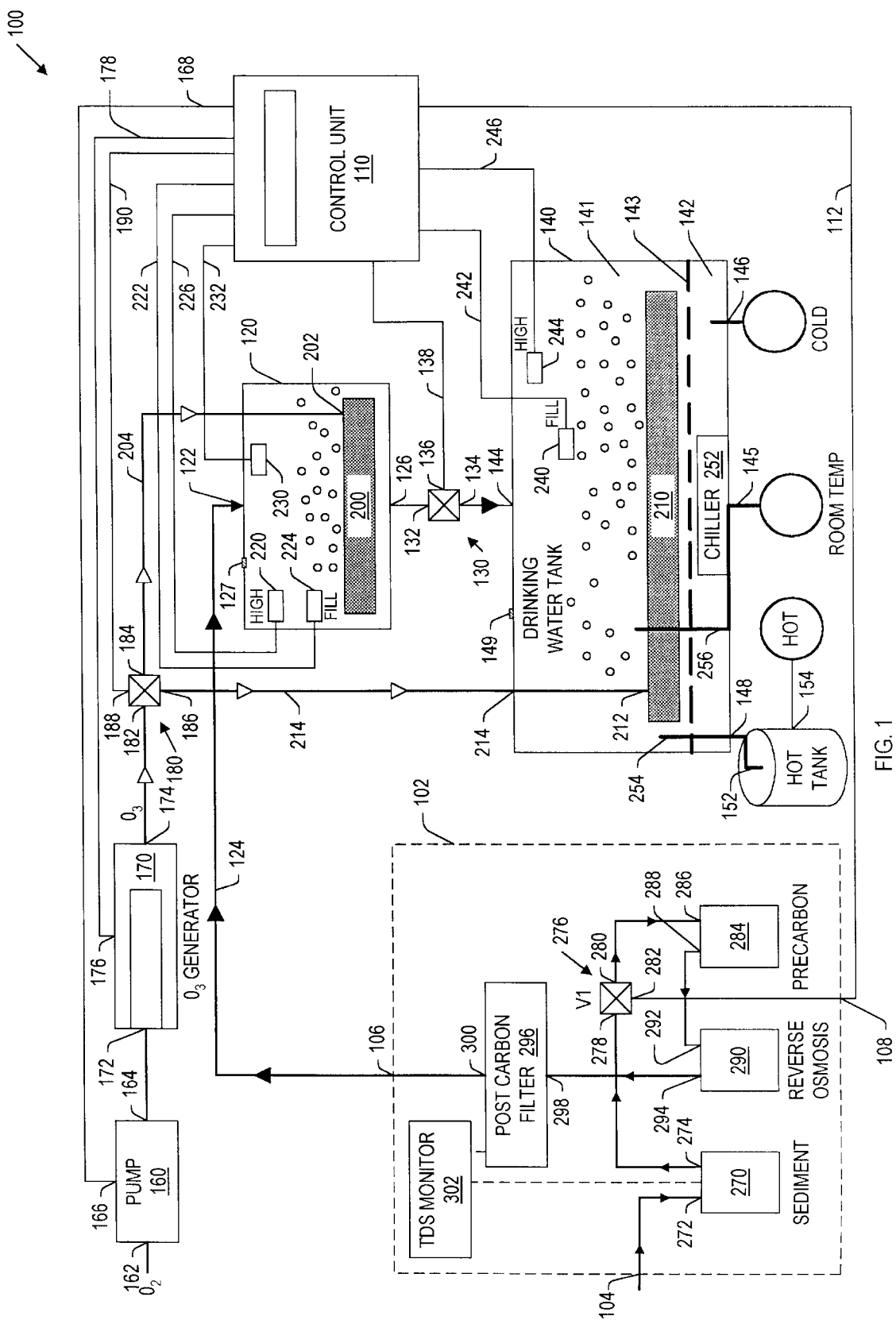

FIG. 1 shows a block diagram at 100 of a two-stage ozone injection drinking water purification system in accordance with the present invention. The system 100 includes: a prefiltering sub-system 102 having an inlet 104 for receiving water from a source (not shown) such as a public water utility. an outlet 106 for providing pre-filtered water to a next stage of the system, and a port 108 for receiving a control signal from a control unit 110 via a line 112, the control signal for controlling the flow of water from outlet 106 as further explained below; a process tank or contact storage tank, 120 having a water inlet 122 coupled to receive pre-filtered water from sub-system 102 via a water conduit 124, a water outlet 126 providing processed water as further explained below, and an air inlet filter 127 for receiving filtered air into the process tank via a passageway (not shown) as water flows out of the process tank via outlet 126, and for allowing air to flow out of the process tank as water flows in via inlet 122; a valve 130 having an inlet 132 for receiving processed water from outlet 126 of the process tank, an outlet 134, and a control port 136 coupled to receive a valve control signal from control unit 110 via a control line 138, the valve control signal for controlling the flow of processed water from inlet 132 to outlet 134; and a drinking water tank 140 having an upper main chamber 141 and a lower chamber 142 divided by a baffle 143, the upper chamber being larger than the lower chamber.

The drinking water tank 140 also includes: an inlet 144 for receiving processed water from outlet 134 of valve 130 under control of the control unit 110; a room temperature water outlet 145 for providing purified water at room temperature; a cold water outlet 146 for providing cold water; a water outlet 148 for providing purified water to a hot water tank 150; and an air inlet filter 149 for receiving filtered air into main chamber 141 of the drinking water tank via a passageway (not shown) as water is dispensed from the drinking water tank, and for allowing air to flow out of the main chamber as water flows into the main chamber via inlet 144. The hot water tank 150 includes an inlet 152 for receiving purified water from outlet 148 of tank 140, and an outlet 154 for providing hot water.

The purification system 100 also comprises ozone water treating components including: an oxygen pump 160 having an input 162 for receiving oxygen ($O_2$), an output 164 for providing oxygen, and a control port 166 coupled to receive a pump control signal from control unit 110 via a line 168, the pump control signal for controlling the rate at which is oxygen is pumped; an ozone generator 170 having an input 172 for receiving oxygen from output 164 of pump 160, an output 174 for providing ozone ($O_3$), and a control input 176 coupled to receive an ozone generator control signal from control unit 110 via a line 178, the ozone generator control signal for controlling the flow of ozone from output 174; and an ozone valve 180 having an inlet 182 for receiving ozone from an output 174 of the ozone generator, a first outlet 184 for providing ozone, a second outlet 186 for providing ozone, and a control input 188 coupled to receive an ozone valve control signal from control unit 110 via a line 190, the ozone valve control signal for controlling the flow of ozone from outlets 814 and 186 as further explained below. In one embodiment, the ozone generator 170 is contained in a small enclosure, and draws approximately 50 watts during normal operation.

In order to optimize cellular destruction of bacteria, bacteria must be brought into intimate contact with ozone. The system 100 includes a high efficiency in-line injector which mixes the ozone into solution, and water detention vessels small enough to provide sufficient contact time for thorough ozonation of the water to occur. The process tank 120 has a first ozone diffuser 200 disposed at a bottom of the tank, the diffuser 200 including an inlet 202 for receiving ozone from first output 184 of the ozone valve via an ozone conduit 204. The drinking water tank 140 includes a second diffuser 210 disposed on the baffle 143. The second diffuser 210 includes a diffusion inlet 212 for receiving ozone from second output 186 of the ozone valve 180 via an ozone conduit 214. In an embodiment, the first and second diffusers 210 are formed by a porous sand stone diffusion device. The porous sand stone diffusion device includes: a plastic housing having a rectangular base panel, four side panels extending orthogally upward from the four edges of the base panel to form a cavity which is open on a top portion of the diffusion device; and a porous sand stone sized to fit tightly in the cavity. Lateral and end surfaces of the sand stone are glued to inner surfaces of the side panels. In this embodiment, diffusion inlet 212 is formed in one of the side panels to provide fluid communication between ozone conduit 214 which is coupled with the diffusion inlet, and an internal chamber of the diffusion device formed between the base panel and the sand stone. Ozone delivered to the internal chamber of the diffusion device via inlet 212, is diffused through small passages in the sand stone into the water. The porous diffusion stones provide optimal ozone transfer by transferring almost all available ozone that can be dissolved into the surrounding water.

The process tank 120 also includes: a high water level sensor 220 for sensing when the water level in the process tank reaches a predetermined high level, and providing a HIGH signal to control unit 110 via an indicator line 222 when the water level reaches the high level; a fill water level sensor 224 for sensing when the water level in the process tank drops below a predetermined fill level, and for providing a FILL signal to control unit 110 via a line 226 when the water level drops below the fill level; an over-flow water level sensor 230 for sensing when the water level in the process tank exceeds a predetermined overflow level and for providing an OVERFLOW signal to control unit 110 via a line 232 when the water level exceeds the overflow level.

The drinking water tank 140 also includes: a high water level sensor 240 for sensing the water level in tank 140 and providing a HIGH signal to control unit 110 via an indicator line 242 when the water level in the process tank reaches a predetermined high level; an overflow water level sensor 244 for sensing when the water level in the process tank exceeds a predetermined overflow level, and providing an OVERFLOW signal to control unit 110 via a line 246 when the water level in the process tank exceeds the overflow level.

In an embodiment, drinking water tank 140 is a 4.6 gallon tank, and process tank 120 is a 0.54 gallon tank. The smaller size of process tank 120, compared with drinking water tank 140, is advantageous because the ozonation sub-process implemented in the process tank is more intense than the ozonation sub-process implemented in the drinking water tank 140. As mentioned above, important parameters in controlling the process of ozonation of water include the time during which the water is injected with ozone, and the volume of water being ozonated. Ozonating a smaller volume of water provides more thorough ozonation which is desirable in the first stage of ozonation, in process tank 120. Ozonating a larger volume of water provides less thorough ozonation which is desirable in the second ozonation stage in drinking water tank 140 in order to avoid over ozonating the water so that the taste of the water is not spoiled.

The drinking water tank 140 further includes: a chilling unit 252 for chilling the water in the lower chamber 142; a conduit 254 providing fluid communication between the main chamber 141 and inlet 152 of hot tank 150; and a conduit 256 providing fluid communication between main chamber 141 and room temperature outlet 145.

The pre-filtering sub-system 102 includes: a sediment filter 270 having an inlet 272 for receiving water from a source (not shown) via inlet 104 of the system, and an outlet 274; a pre-filtered water valve 276 having an inlet 278 for receiving water from outlet 274 of the sediment filter, an outlet 280, and a control input 282 for receiving a control signal from control unit 110 for controlling the flow of water from inlet 278 to outlet 280; a pre-carbon filter 284 having an inlet 286 for receiving water from outlet 280 of valve 276, and an outlet 288, a reverse osmosis filter 290 having an inlet 292 for receiving water from outlet 288 of the pre-carbon filter, and an outlet 294; a post-carbon filter 296 having an inlet 298 for receiving water from outlet 294 of the reverse osmosis filter. and an outlet 300 providing the pre-filtered water to the inlet 122 of process tank 120 via conduit 124; and a total dissolved solids (TDS) monitor 302 responsive to sensors (not shown) which monitor the amount of solids in water before and after filtering by reverse osmosis filter 290. The pre-filtering sub-system 102 is not an essential element to the practice of the present invention.

The filters 270, 284, 290, and 296 are preferably snap-in, snap-out filters that are designed for case of maintenance by the user. The sediment filter 270 removes dirt, rust, slit, and other minute impurities. In one embodiment, the sediment filter 270 uses a 5-micron sediment filter which can remove impurities 15 times smaller than a grain of sand. The reverse osmosis filter 290 utilizes a cellulose acetate membrane to remove toxic heavy metals such as lead, mercury, and arsenic, and other trace metals such as iron, sulfur and manganese. The pre-carbon filter 284 removes chlorine, trihalomethanes (such as chloroform and carbon tetrachloride). radon, pesticides, herbicides, and other volatile organic hydrocarbons from the water. The post-carbon filter 296 enhances the water's taste by removing dissolved gases and odors using a granular activated charcoal filter.

In operation, the flow of pre-filtered water to process tank 120 is controlled by control unit 110 by opening and closing valve 276 in response to the HIGH and FILL signals received from indicators 220, 224. When the water level in the process tank drops below the predetermined fill level, the FILL signal is activated and, responsive thereto, the control unit opens valve 276 to begin filling the process tank. When the water level in the process tank reaches the predetermined HIGH level, the HIGH signal is activated and, responsive thereto, the control unit closes valve 276 to stop filling the process tank.

In operation, the flow of processed water to drinking water tank 140 is controlled by control unit 110 by opening and closing valve 130 in response to the HIGH and FILL signals received from indicators 240 and 244. When the water level in tank 140 drops below the predetermined fill level, the FILL signal is activated, and the control unit responds by opening valve 130 to allow water to flow by gravity feed from outlet 126 of process tank 120 to inlet 144 of drinking water tank 140. When the water level in the drinking water tank 140 reaches the predetermined HIGH level, the HIGH signal is activated, and the control unit responds by closing valve 130 to stop filling the drinking water tank.

Upon activation of the high float sensor 220. indicating that the water level in the process tank has reached the predetermined high level, the control unit 110 closes valve 276 and begins a first stage ozonation process. During the first stage ozonation sub-process, control unit 110 activates pump 160 and generator 170, and controls ozone valve 180 to pass ozone from its input 182 to its first output 184. In one embodiment, the first stage ozonation process is activated to provide ozone injection to the process tank for a period of six minutes.

A second ozone injection stage provides for additional ozone to be injected into the water in the drinking water tank 140 on a regular, daily basis. During the second stage ozonation sub-process, control unit 110 activates pump 160 and generator 170, and controls ozone valve 180 to pass ozone from its input 182 to its second output 186. In one embodiment, the second stage ozonation process is activated to provide ozone injection to the drinking water tank for a period of two minutes. The second ozonation injection stage is limited to a relatively short time period so that water in tank 140 is not overly ozonated. In one embodiment of the present invention the second ozonation injection stage is activated once every six hours for a time period of two minutes.

The second ozonation injection stage ensures that the drinking water tank 140 is self sanitized. Potential bacteria build up in the drinking water tank 140 is prevented by the second ozonation stage.

The second ozonation injection stage provides maximum contact time between ozone and drinking water before the water is consumed by the user. The water initially treated with ozone in the process tank, is retreated with ozone prior to consumption.

As part of the system, a microprocessor re-oxygenates water in the drinking water tank on a regular basis. Thus. elimination of pathogens (viruses, bacteria, and parasites) in the water is accomplished initially in the process tank 120, and subsequently in the drinking water tank 140. In both instances, the pre-set programming period of ozonation of the water may be determined by the user. Purified drinking water is then dispensed from the drinking water tank 140 to the user.

The present invention ensures that a dissolved ozone residual will serve as a sterilant through the final stage of the household drinking water distribution system. The system 100 ensures that the drinking water will remain sterile until it is consumed by the user because the drinking water tank is self sanitized.

Figure 2:
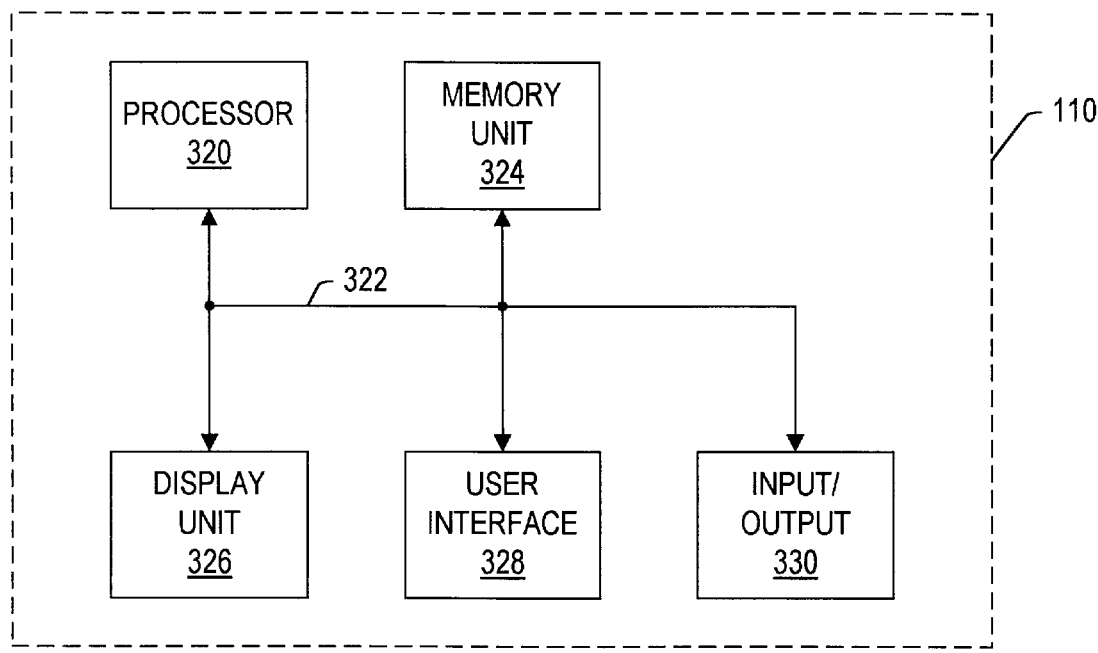

FIG. 2 shows a block diagram illustrating components of the control unit 110 (FIG. 1) in accordance with one embodiment of the present invention. Control unit 110 includes: a processing unit 320 coupled to a system bus 322; a computer readable memory unit 324 coupled to the system bus (having a volatile memory unit and a non-volatile memory unit); a display unit 326 coupled to the system bus; a user interface 328, such as a keyboard and mouse, coupled to the system bus; and an external input/output device interface unit 330 coupled to the system bus. The interface unit 330 also includes a plurality of ports (not shown) for communicating with water level sensors 220, 224, 230, 240, and 244 (FIG. 1), water valves 130 and 276, ozone valve 180, pump 160, and generator 170. The computer readable memory unit 324 includes encoded instructions stored therein for executing the two-stage ozonation process described above. The ozonation time periods and frequency of activating the second ozonation period may be selected by a user of the system 100 (FIG. 1) via user interface unit 328.

Figure 3:
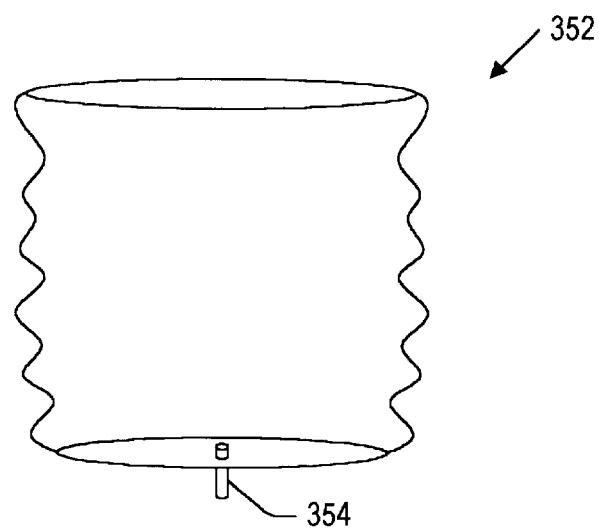

FIG. 3 shows a perspective view at 350 of a collapsible drinking water tank 352 in accordance with an alternative embodiment of the present invention. Tank 352, which provides an alternative embodiment of the drinking water tank 140 (FIG. 1), includes at least one water outlet 354. Note that tank 352 does not require an air inlet for dispensing water from outlet 354, and therefore, water stored in tank 352 is protected from contamination by air.

The ozone contact time in the present invention provided by the Double Stage Ozone Injection™ system is sufficient to provide adequate disinfection for Legionella. Guidelines for ozone disinfection were established in 1967 based on a series of studies done in 1964 through 1966 on Poliovirus which determined that maintaining a dissolved ozone residual in water guarantees at least a 99.99 percent virus inactivation. The ozone contact time in the present invention surpasses that ozone residual.

Although the present invention has been particularly shown and described above with reference to a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A two stage ozonation water purification system for eliminating deleterious pathogens from water, the system comprising:
    a first tank having a first volume;
    a second tank having a second volume, said first volume being substantially smaller than said second volume;
    means for delivering water to said first tank;
    a first ozone injection means for injecting ozone into said water contained in said first tank for a first predetermined time period;
    means for transferring said water from said first tank to said second tank; and
    a second ozone injection means for injecting ozone into said water contained in said second tank for a second predetermined time period.

2. A two stage ozonation water purification system as recited in claim 1 further comprising a porous diffusion stone disposed in said first tank, said diffusion stone being in fluid communication with said first ozone injection means and providing optimal diffusion of said ozone into said water contained in said first tank.

3. A two stage ozonation water purification system as recited in claim 1 further comprising a porous diffusion stone disposed in said second tank, said diffusion stone being in fluid communication with said second ozone injection means and providing optimal diffusion of said ozone into said water contained in said second tank.

4. A two stage ozonation water purification system as recited in claim 1 wherein said second tank is a dispensing tank including at least one outlet providing purified water for human consumption.

5. A two stage ozonation water purification system as recited in claim 1 wherein said first ozone injection means is operative to inject ozone into said water contained in said first tank during a first predetermined time period of approximately six minutes, and said second ozone injection means is operative to inject ozone into said water contained in said second tank during a second predetermined time period of approximately 2 minutes.

6. A two stage ozonation water purification system as recited in claim 1 further comprising a control unit coupled to said first and second ozone injection means, said control unit being operative to activate said first and second ozone injection means to initiate said injection of ozone into said water in said first and second tanks.

7. A two stage ozonation water purification system as recited in claim 6 wherein said control unit is operative to activate said second ozone injection means once every six hours and wherein said second predetermined time period is approximately 2 minutes.

8. A two stage ozonation water purification system as recited in claim 6 further comprising a high water level sensor for sensing when the water level in said first tank is at a predetermined high level, said high water level sensor being further operative to generate a signal when the water level is at said high level, said control unit being responsive to said signal and operative to initiate said injection of ozone into said water in said first tank in response to said signal.

9. A two stage ozonation water purification system as recited in claim 6 wherein said control unit is responsive to a user input, and operative to set said first and second predetermined time periods based on said user input.

10. A two stage ozonation water purification system as recited in claim 6 wherein said control unit includes a display means for displaying to a user indications of the progress of said injection of ozone.

11. A two stage ozonation water purification system as recited in claim 1 wherein said second tank is a collapsible tank having an outlet for dispensing water, said collapsible tank not requiring an air inlet for dispensing water via said outlet.

12. A two stage ozonation water purification system for eliminating deleterious pathogens from water, the system comprising:
    a first tank;
    a second tank;
    means for delivering water to said first tank;
    a first ozone injection means for injecting ozone into said water contained in said first tank for a first predetermined time period;
    means for transferring said water from said first tank to said second tank;
    a second ozone injection means for injecting ozone into said water contained in said second tank for a second predetermined time period;

a control unit communicatively coupled with said first and second ozone injection means, said control unit being operative to activate said first and second ozone injection means to initiate said injection of ozone into said water in said first and second tanks; and a high water level sensor for sensing when the water level in said first tank is at a predetermined high level, said high water level sensor being further operative to generate a signal when the water level is at said high level, said control unit being responsive to said signal and operative to initiate said injection of ozone into said water in said first tank in response to said signal.

13. A two stage ozonation water purification system for eliminating deleterious pathogens from water, the system comprising:

a first tank;

a second tank having an outlet for dispensing water, said second tank being collapsible and not requiring an air inlet for dispensing water via said outlet;

means for delivering water to said first tank;

a first ozone injection means for injecting ozone into said water contained in said first tank for a first predetermined time period;

means for transferring said water from said first tank to said second tank; and a second ozone injection means for injecting ozone into said water contained in said second tank for a second predetermined time period.

* * * * *